(12) United States Patent
Piringer

(10) Patent No.: US 10,301,219 B2
(45) Date of Patent: May 28, 2019

(54) PARALLEL-FLOW REGENERATIVE LIME KILNS AND PROCESSES FOR BURNING AND COOLING CARBONATE ROCK IN SAME

(71) Applicant: MAERZ OFENBAU AG, Zürich (CH)

(72) Inventor: Hannes Piringer, Beinwil am See (CH)

(73) Assignee: MAERZ OFENBAU AG, Zürich (CH)

( * ) Notice: Subject to any disclaimer, the term of this patent is extended or adjusted under 35 U.S.C. 154(b) by 441 days.

(21) Appl. No.: 14/909,687

(22) PCT Filed: Jul. 28, 2014

(86) PCT No.: PCT/EP2014/002056
§ 371 (c)(1),
(2) Date: Feb. 2, 2016

(87) PCT Pub. No.: WO2015/018504
PCT Pub. Date: Feb. 12, 2015

(65) Prior Publication Data
US 2016/0176760 A1   Jun. 23, 2016

(30) Foreign Application Priority Data

Aug. 5, 2013 (DE) .......... 10 2013 108 410

(51) Int. Cl.
*C04B 28/10* (2006.01)
*F27B 1/02* (2006.01)
(Continued)

(52) U.S. Cl.
CPC .......... *C04B 28/10* (2013.01); *C04B 2/12* (2013.01); *F27B 1/005* (2013.01); *F27B 1/02* (2013.01);
(Continued)

(58) Field of Classification Search
CPC .... F27B 1/02; F27B 1/04; F27B 1/005; F27B 1/10; F27B 7/38; C04B 28/10; C04B 2/12
(Continued)

(56) References Cited

U.S. PATENT DOCUMENTS 3,074,706 A * 1/1963 Schmid ............... F27B 1/02
432/14
4,315,735 A   2/1982 Fussl et al.
(Continued)

FOREIGN PATENT DOCUMENTS

CA      1124513 A    6/1982
DE      3038927 A1   11/1981

OTHER PUBLICATIONS (Hannes Piringer, "Schuttgutbewegung, Stromungsverhalten und Temperaturverteilung in der Kuhlzone eines 800 und 1000 tato MAERZ-Regenerativ-Kalkschachtofens," Veitsch-Radex Rundschau 1/199, Jan. 31, 1999 (Jan. 31, 1999), pp. 1-13, XP055146833) (Note that this non-patent literature document has been provided by Applicant in the IDS filed Feb. 4, 2016).*
(Continued)

*Primary Examiner* — Steven B McAllister
*Assistant Examiner* — Benjamin W Johnson
(74) *Attorney, Agent, or Firm* — thyssenkrupp North America, Inc.

(57) ABSTRACT

Burning and cooling carbonate rock in cocurrent regenerative lime kilns may involve alternately operating two shafts such that a first shaft operates as a burning shaft and a second shaft operates as a regenerative shaft during a first period and such that the first shaft operates as the regenerative shaft and the second shaft operates as the burning shaft during a second period. Carbonate rock introduced to upper regions of the shafts may be preheated and calcined. The carbonate rock may then be cooled in lower regions of the shafts before
(Continued)

Figure 1:
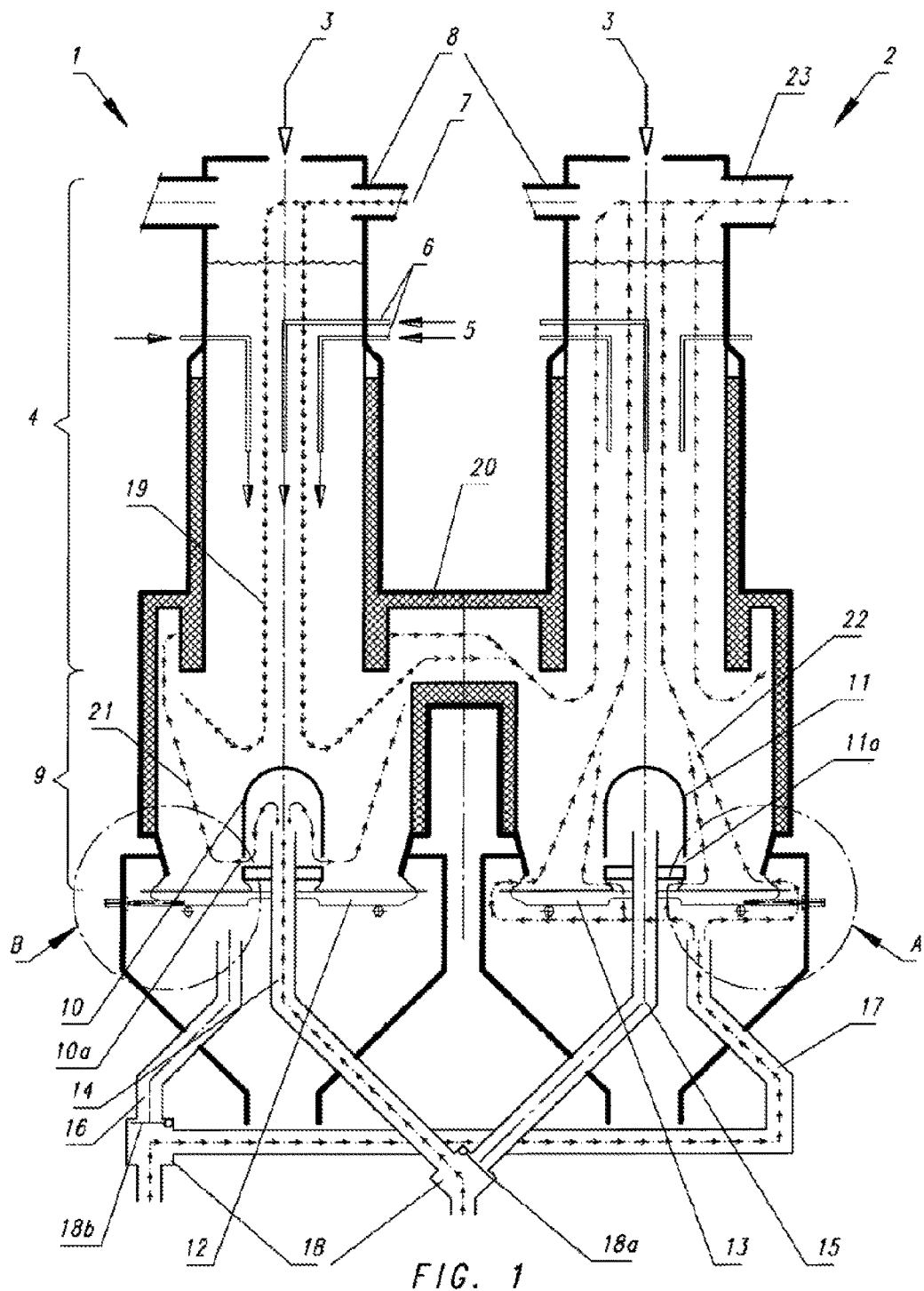

being discharged through discharge devices. The cooling of the carbonate rock may comprise introducing cooling air into the shafts partially through central displacement bodies in the shafts and partially through the discharge devices. Amounts of air entering through the central displacement bodies compared to the discharge devices may vary widely from the burning shaft to the regenerative shaft.

8 Claims, 4 Drawing Sheets

(51) Int. Cl.
    *C04B 2/12*     (2006.01)
    *F27B 1/04*     (2006.01)
    *F27B 1/10*     (2006.01)
    *F27B 1/00*     (2006.01)
    *F27B 7/38*     (2006.01)

(52) U.S. Cl.
    CPC ................. *F27B 1/04* (2013.01); *F27B 1/10* (2013.01); *F27B 7/38* (2013.01)

(58) Field of Classification Search
    USPC ...................................... 432/95, 99, 100, 101
    See application file for complete search history.

(56) References Cited

U.S. PATENT DOCUMENTS

| | | | |
|---|---|---|---|
| 4,534,731 A | 8/1985 | Fussl et al. | |
| 5,460,517 A * | 10/1995 | Scheibenreif | C04B 2/12 432/95 |
| 6,453,831 B1 * | 9/2002 | Zeisel | C04B 2/12 110/347 |

OTHER PUBLICATIONS

Hannes Piringer, "Schüttgutbewegung, Strömungsverhalten und Temperaturverteilung in der Kühlzone eines 800 und 1000 tato MAERZ-Regenerativ-Kalkschachtofens," Veitsch-Radex Rundschau 1/199, Jan. 31, 1999 (Jan. 31, 1999), pp. 3-15, XP055146833.
Int'l Search Report for PCT/EP2014/002056 dated Nov. 19, 2014 (dated Dec. 2, 2014).

* cited by examiner

PARALLEL-FLOW REGENERATIVE LIME KILNS AND PROCESSES FOR BURNING AND COOLING CARBONATE ROCK IN SAME

CROSS REFERENCE TO RELATED APPLICATIONS

This application is a U.S. National Stage Entry of International Patent Application Serial Number PCT/EP2014/002056, filed Jul. 28, 2014, which claims priority to German Patent Application No. DE 102013108410.9 filed Aug. 5, 2013, the entire contents of both of which are incorporated herein by reference.

FIELD

The present disclosure relates to parallel-flow regenerative lime kilns and processes for burning and cooling carbonate rock in such kilns.

BACKGROUND

One known prior art kiln, which is disclosed in DE 30 38 927 C2, operates cyclically, with burning being carried out only in the burning shaft while the other shaft operates as regenerative shaft. During a cycle, which takes, for example, 10-12 minutes, the carbonate rock to be burned is discharged continuously via discharge devices on both shafts. The column of material descends uniformly in the shafts. The operation of the kiln is then changed so that the shaft which has previously operated as burning shaft becomes the regenerative shaft and the shaft which has previously operated as regenerative shaft in turn becomes the burning shaft. The charging of the kiln with carbonate rock is carried out during the change of operation or during the burning process on the regenerative shaft. In the lower region of the two shafts, cooling zones for cooling the carbonate rock calcined in the upper region are provided, with part of the cooling air used for this purpose being fed in in the region of the discharge devices and part being fed in via a central displacement body arranged in each cooling zone.

The quality of the end product depends critically on the calcined carbonate rock descending very uniformly downward over the width of the shaft and the cooling zone being configured so that very uniform cooling is ensured. The above-described cocurrent regenerative lime kiln is known from the article by Hannes Piringer, "Schüttgutbewegung, Stromungsverhalten und Temperaturverteilung in der Kühlzone eines 800 und 1000 tato Maerz-Regenerativ-Kalkschachtofens", Veitsch-Radex Rundschau 1/1999, pages 1 to 15. In addition, studies on an optimal configuration of the cooling zone and of the discharge devices are presented in detail.

It is known from industrial practice that in the case of cocurrent regenerative lime kilns, the angle of inclination in the cooling zone has to be very steep since, particularly in the case of small pieces of rock (e.g. from 10 to 50 mm), the material being burned no longer descends at the outer margin of the cooling zone and larger accumulations are formed as a result. A change has therefore been made in the case of the Maerz fine rock kilns to cylindrical or slightly conical cooling zones having an angle of inclination of more than 82°. Although this has been able to alleviate the problems of material buildup, other disadvantages occur as a result of this construction. Due to the construction, the exit diameter at the lower end of the cooling zone is significantly larger, so that it is difficult to distribute the cooling air uniformly in the cooling zone in order to cool the burned material uniformly. However, nonuniform cooling of the burned material results, in particular, in the burned material not being cooled sufficiently in the middle of the shaft, as a result of which damage can occur at the discharge devices. On the other hand, the burned material is cooled too greatly in the outer region, especially in the upper region of the cooling zone, as a result of which an unwanted reaction of the combustion exhaust gases with the burned material can occur and the burned material once again becomes enriched in $CO_2$ from the combustion exhaust gases and the product quality is thereby impaired. To avoid local overheating, the specific amount of cooling air for cooling the burned material has therefore been increased, but this in turn also results in an increased exhaust gas temperature, which adversely affects the heat consumption. In addition, it has been proposed that the central displacement body be enlarged, which improves the cooling air distribution, especially in the lower part. In the case of large displacement bodies, the tip reaches virtually to the lower end of the burning zone. However, they are very complicated and expensive since they have to be made with a double wall and have to be continually cooled with air, even when the kiln is not in operation.

A change has therefore been made back to smaller displacement bodies which extend at most to half the height of the cooling zone. In order to achieve a very good cooling action, the major part of the cooling air, usually at least 85%, has been introduced via the discharge devices and the remainder of not more than 15% has been introduced via the central displacement bodies.

BRIEF DESCRIPTION OF THE FIGURES

FIG. 1 is a schematic view of an example cocurrent regenerative lime kiln.

FIG. 2 is an enlarged view of a detail A of the example cocurrent regenerative lime kiln of FIG. 1.

FIG. 3 is an enlarged view of a detail B of the example cocurrent regenerative lime kiln of FIG. 1.

FIG. 4 is a schematic view showing an example flow path in a region of an example cooling zone of two shafts of a cocurrent regenerative lime kiln.

FIG. 5 is a schematic view depicting an example temperature distribution in an example cooling zone of a cocurrent regenerative lime kiln.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

It was an object of the invention to achieve even more uniform cooling in the cooling zones of a cocurrent regenerative lime kiln using a very small amount of cooling air.

The process of the invention for burning and cooling carbonate rock is carried out in a cocurrent regenerative lime kiln having two shafts which are operated alternately as burning shaft and as regenerative shaft, where a. the carbonate rock is introduced in an upper region configured as preheating and burning zone of each shaft and is preheated and calcined there, b. the calcined carbonate rock is subsequently cooled in a lower region configured as cooling zone and having a central displacement body of each shaft,
c. the cooled, calcined carbonate rock is subsequently discharged via a discharge device assigned to each shaft, and where
d. cooling air is introduced into the cooling zone to cool the calcined carbonate rock, part of which is introduced in the region of the discharge device and part of which is introduced via the displacement body,
e. the amount of cooling air to be fed into the burning shaft is fed in to an extent of from 90 to 100% via the displacement body and to an extent of not more than 10% in the region of the discharge device, while the amount of cooling air to be fed into the regeneration shaft is fed to an extent of from 90 to 100% in the region of the discharge device and to an extent of not more than 10% via the displacement body.

The cocurrent regenerative lime kiln of the invention for burning and cooling carbonate rock according to the above process has two shafts operated alternately as burning shaft and as regenerative shaft, wherein
a. the upper region of each shaft is configured as preheating and burning zone for preheating and calcining carbonate rock introduced,
b. the lower region of each shaft is configured as cooling zone for cooling the calcined carbonate rock,
c. the cooling zones each have a central displacement body which has gas exit openings which open into the respective cooling zone,
d. a discharge device adjoining the cooling zone for discharging the cooled, calcined carbonate rock is provided,
e. where a first cooling air conduit is connected to the gas exit openings of the displacement body of the one shaft and a second cooling air conduit is connected to the gas exit openings of the displacement body of the other shaft in order to feed cooling air in via the displacement bodies,
f. a third cooling air conduit opens into the region of the discharge device of the one shaft and a fourth cooling air conduit opens in the region of the discharge device of the other shaft and
g. a control device is provided in order to control the amount cooling air conduit and also via the third and/or fourth cooling air conduit in such a way that the amount of cooling air to be fed into the burning shaft is fed in to an extent of from 90 to 100% via the displacement body and to an extent of not more than 10% in the region of the discharge device, while the amount of cooling air to be fed into the regeneration shaft is fed in to an extent of from 90 to 100% in the region of the discharge device and to an extent of not more than 10% via the displacement body.

This novel concept of cooling air volume distribution gives very uniform cooling in the cooling zones, so that the isothermal lines in the cooling zone are approximately horizontal. This firstly makes a very uniform and high product quality possible and secondly prevents the discharge device from being damaged by excessively hot carbonate rock. Furthermore, the novel way in which the cooling air is introduced reduces the total amount of cooling air required for product cooling. In the calcination of carbonate rock having a $CaCO_3$ content of more than 97%, it is less than 0.7 standard $m^3$/kg of calcined carbonate rock, preferably less than 0.65 standard $m^3$/kg of calcined carbonate rock. An amount of cooling air of more than 0.75 standard $m^3$/kg of calcined carbonate rock has hitherto usually been necessary, in particular in the case of small-rock kilns (fine rock kilns).

Further embodiments of the invention are subject matter of the dependent claims.

In a further embodiment of the invention, 20-50% of the cooling air fed into the two shafts is fed to the burning shaft and the remaining amount is fed to the regenerative shaft. Preference is given to 30%+/−10% of the cooling air fed into the two shafts being fed to the burning shaft and the remaining amount being fed to the regenerative shaft. In the experiments underlying the invention, it has been found that the best results can be achieved when about ⅓ of the total cooling air is fed to the burning shaft and about ⅔ of the total cooling air is fed to the regenerative shaft.

The cooling air fed into the region of the discharge devices is advantageously fed in via dams of material formed in this region by the calcined and cooled carbonate rock. In a further embodiment of the invention, the cooling air fed into the region of the discharge devices should flow essentially upward and to the middle of the shaft. The cooling air fed in via the displacement bodies should, on the other hand, flow essentially upward and to the outer boundary of the shaft.

The uniform cooling of the carbonate rock is also assisted by the mode of operation of the discharge device, which preferably discharges the calcined and cooled carbonate rock radially outward and radially inward, with 60-80% of the calcined and cooled carbonate rock being discharged outward and the remainder being discharged inward.

The cooling zone is preferably cylindrical or slightly conical and has an angle of inclination of more than 82°. In order to ensure good cooling, the diameter at the lower end of the cooling zone should also be 1.1-1.5 times as large as the diameter at the lower end of the preheating and burning zone.

Regulation of the amount of cooling air via the first to fourth cooling air conduit is preferably effected by means of a flap system which can be controlled by the control device.

The cocurrent regenerative lime kiln shown in FIG. 1 for burning and cooling carbonate rock has two shafts 1, 2 which are operated alternately in a manner known per se as burning shaft and as regenerative shaft. The carbonate rock 3 having, for example, a particle size range of from 10 mm to 50 mm is introduced in an upper region configured as preheating and burning zone 4 of each shaft. Furthermore, fuel 5 is introduced via a fuel conduit 6 and combustion air 7 is introduced via at least one combustion air conduit 8. The combustion of the fuel 5 with the combustion air 7 preheats and calcines the carbonate rock 3 in the region of the preheating and burning zone. The calcined carbonate rock subsequently goes into a lower region, which is configured as cooling zone 9 and has a central displacement body 10, 11, of each shaft and is cooled there. The cooled, calcined carbonate rock is subsequently discharged via a discharge device 12, 13 assigned to each shaft. The carbonate rock 3 therefore travels under gravity from the top downward. The usual residence time is, for example, 20 hours. The amount of the cooled carbonate rock discharged at the bottom is replaced in the upper region by carbonate rock 3 which is still to be treated.

The cooling of the calcined carbonate rock is effected by cooling air which is fed into the cooling zone 9 at two places, namely via the displacement body 10 or 11 and in the region of the discharge devices 12 and 13.

The displacement bodies are each located centrally in the cooling zone and can, for example, have a conical shape or, as shown, a shape that is rounded at the top. In the lower region of the displacement bodies 10, 11, these bodies are provided over their total circumference with gas exit openings 10a and 11a.

Furthermore, a first cooling air conduit 14 is connected to the gas openings 10a of the displacement body 10 of the shaft 1 and a second cooling air conduit 15 is connected to the gas exit openings 11a of the displacement body 11 of the second shaft 2 for introduction of cooling air via the displacement bodies. Furthermore, a third cooling air conduit 16 opens into the region of the discharge device 12 of the first shaft 1 and a fourth cooling air conduit 17 opens into the region of the discharge device 13 of the second shaft 2. The air distribution of the amount of cooling air introduced via the four cooling air conduits can be regulated by means of a suitable flap system 18 which comprises at least one first flap 18a and a second flap 18b. FIG. 1 shows the flow paths in a situation in which the shaft 1 is operated as burning shaft and the shaft 2 is operated as regeneration shaft. The flap system 18 is controlled by means of a control, which is not shown in more detail here, so that essentially the total amount, but at least at least 90%, of the cooling air to be fed into the shaft 1 is fed via the first cooling air conduit 14 to the displacement body 10, while the amount of cooling air in the shaft 2 is fed in essentially exclusively via the associated discharge device 13. The cooling air can thus be fed in as desired via the displacement body 10 or the displacement body 11 by means of the flap 18a. It can be ensured by suitable measures that a relatively small amount of barrier air still flows through the closed cooling air conduit in order to avoid blocking of the gas exit openings of the displacement bodies. In a corresponding way, the cooling air can be conveyed either via the third cooling air conduit 16 or the fourth cooling air conduit 17 by means of the flap 18b; the provision of a small amount of barrier air is also conceivable here.

The first and second cooling air conduits 14, 15 which are connected to the displacement bodies 10 and 11 advantageously open into the interior of the hollow displacement bodies, so that the cooling air then exits via the gas exit openings 10a and 11a into the cooling zone. The third and fourth cooling air conduits 16, 17 open below the discharge devices 12, 13, so that the cooling air is fed via dams of material 3a, 3b formed by the calcined and cooled carbonate rock onto the discharge devices 12, 13 (see FIG. 2).

In the upper region of the shaft 1, flue gases 19 are formed by combustion of the fuel 5 with the combustion air 7 and these exit in a downward direction from the burning zone and go via the overflow channel 20 connecting the two shafts into the shaft 2. The cooling air 21 fed in via the displacement body 10 is displaced by the flue gases flowing out of the burning zone from the top downward, so that the cooling air 21 flows essentially upward and to the outer boundary of the shaft 1, and then it goes together with the flue gases via the overflow channel 20 into the shaft 2.

The flow paths in the regeneration shaft 2, on the other hand, are fundamentally different. Firstly, no combustion air is fed in from the top there and also no combustion takes place. Rather, the flue gases 19 and the cooling air 21 flow upward from the shaft 1 together with the cooling air 22 from the shaft 2 and are discharged at the top via an exhaust gas conduit 23. Since the cooling air 22 in the shaft 2 is fed in essentially exclusively via the discharge device 13, a cooling air flow which is directed essentially upward and in the direction of the middle of the shaft is established. After a predetermined cycle of, for example, 10-12 minutes has ended, the function of the two shafts is changed so that the shaft 1 then becomes the regeneration shaft and the shaft 2 functions as burning shaft. In a corresponding way, the introduction of the cooling air is then also changed correspondingly, so that it is always ensured that the amount of air to be fed into the shaft now functioning as burning shaft is fed in to an extent of 90-100% via the displacement body and to an extent of not more than 10% in the region of the discharge device, while the amount of cooling air to be fed into the regeneration shaft is fed in to an extent of 90-100% in the region of the discharge device and to an extent of not more than 10% via the displacement body.

Figure 4:
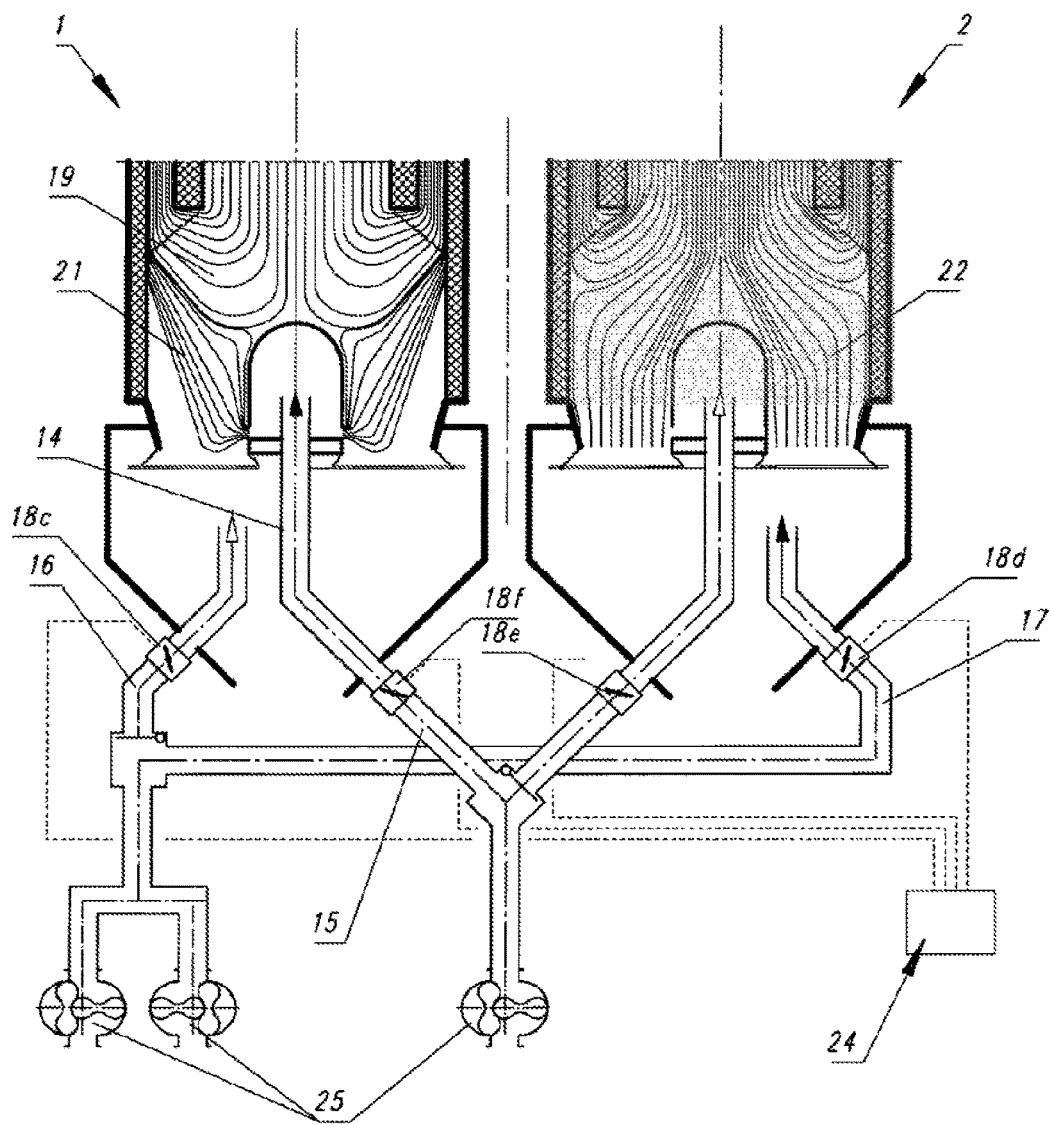

In FIG. 4, the flow lines of the cooling air 21 and 22 and the flue gases 19 are drawn in for the situation described in FIG. 1, in which the shaft 1 is operated as burning shaft and the shaft 2 is operated as regeneration shaft. It is here possible to see a very uniform introduction of cooling air into the cooling zones.

Apart from the division of the introduction of the cooling air via the displacement body of the burning shaft and the discharge device of the regeneration shaft, it is also advantageous for the amount of cooling air to be fed into the burning shaft to be kept smaller than the amount of cooling air to be fed into the regeneration shaft. A division in which from 30% to 50% of the cooling air is fed in via the displacement body of the burning shaft and the remainder of the cooling air is fed in via the discharge device of the regeneration shaft has been found to be particularly effective.

In the illustrative embodiment shown in FIG. 4, the cooling air conduits 14 to 17 are each provided with a flap 18c, 18d, 18e and 18f which can be controlled via a control device 24. In addition, cooling air suppliers 25 are indicated schematically.

Figure 5:
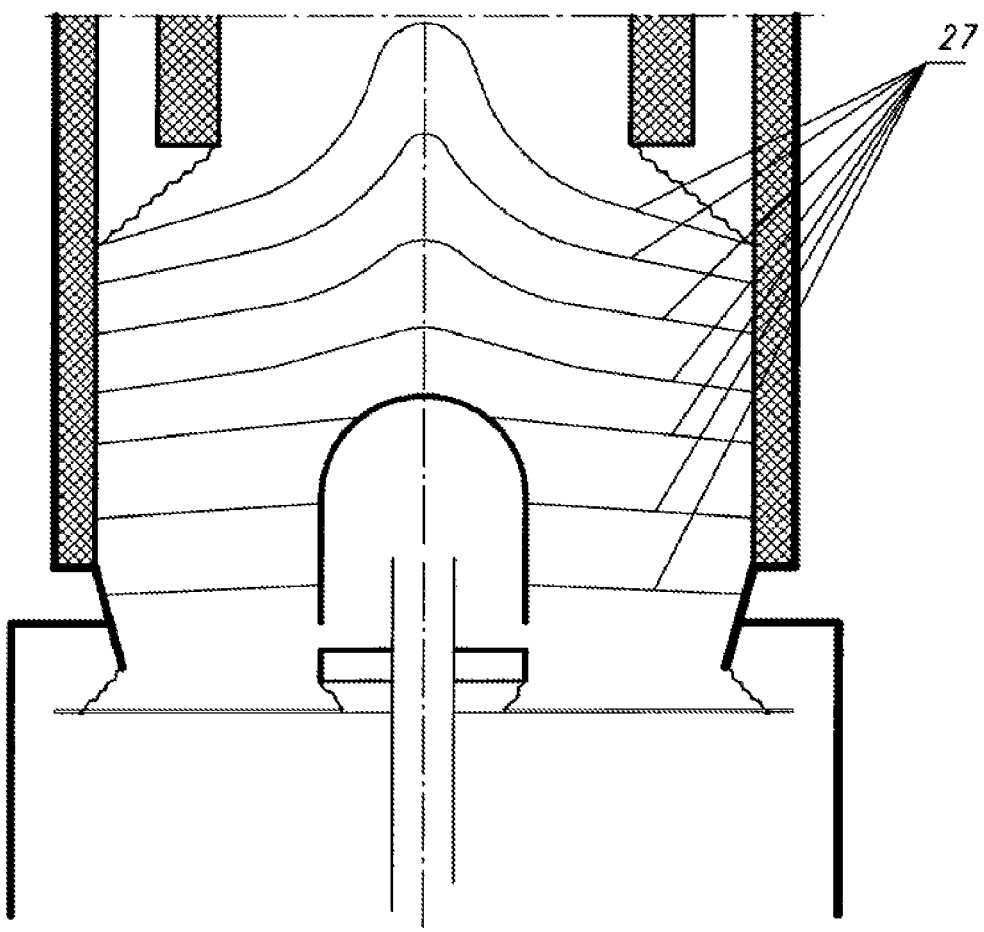

It can be seen from FIG. 5 that isothermal lines 27 which run essentially horizontally are established in the region of the cooling zone, so that very uniform cooling of the calcined carbonate rock over the width of the cooling zone is ensured. There is thus no formation of trough-like sagging isothermal lines which could lead to damage to the discharge devices due to excessively hot material.

Figure 2:
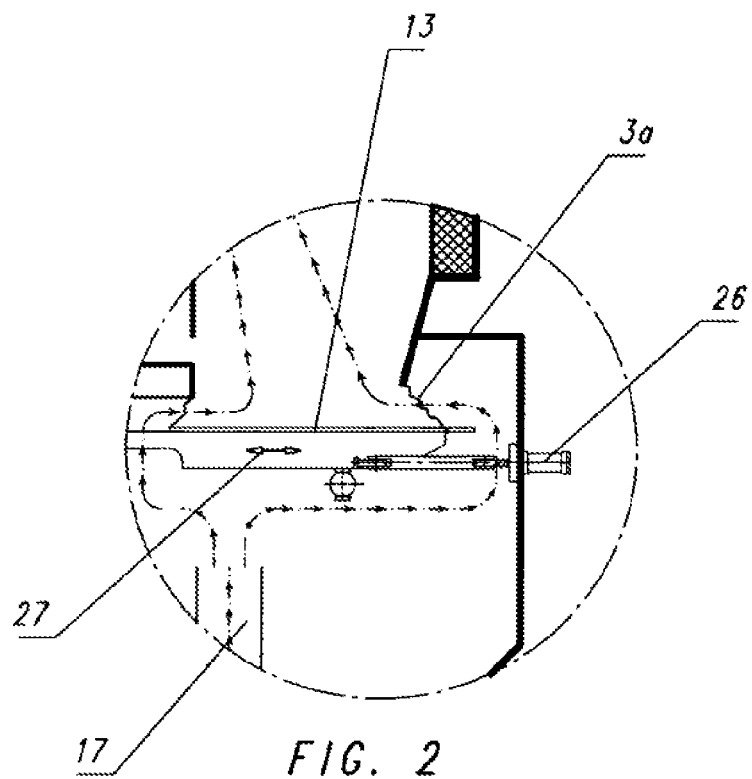
Figure 3:
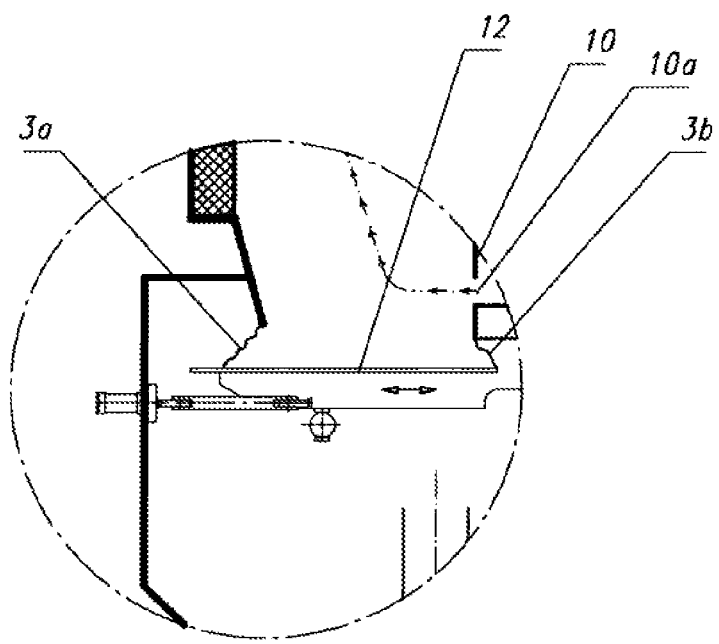

The discharge devices 12, 13 are, as shown in FIGS. 2 and 3, configured in such a way that the calcined and cooled carbonate rock can be discharged radially outward or radially inward. For this purpose, the discharge devices each have, for example, a segment-like discharge table which can be moved by means of a pushing mechanism 26 in the direction of the double arrow 27. If the discharge device 13 is moved toward the left in the illustrative embodiment shown in FIG. 2, it is pushed underneath the carbonate rock until the rock falls downward on the outside. When the discharge device is moved in the opposite direction, discharge occurs in an inward direction. Naturally, the discharge of the material also has a critical influence on whether the carbonate rock slides very uniformly downward over the entire width. In the case of this type of discharge device, it has been found to be advantageous for 60-80% of the calcined and cooled carbonate rock to be discharged in an outward direction and the remainder to be discharged in an inward direction.

In order to ensure effective cooling, the diameter at the lower end of the cooling zone is selected so that it is from 1.1 to 1.5 times as great as the diameter at the lower end of the preheating and burning zone; for the purposes of the present invention, the diameter is the internal diameter of the cooling zone or the preheating and burning zone. The above-described air distribution in the burning shaft and the regeneration shaft, respectively, makes extremely efficient cooling possible, so that the total amount of cooling air to be introduced in the calcination of carbonate rock having a $CaCO_3$ content of more than 97% can be reduced to less than 0.7 standard $m^3$/kg of calcined carbonate rock, preferably to less than 0.65 standard $m^3$/kg of calcined carbonate rock. This has the advantage that the amount of gas to be discharged via the exhaust gas conduit 23 is also reduced correspondingly and the heat consumption of the kiln decreases.

The air distribution according to the invention additionally leads to a great reduction in the flow along the periphery which has previously been observed. In addition, the risk of local regions in which recarbonization can occur can be reduced.

What is claimed is:

1. A process for burning and cooling carbonate rock in a cocurrent regenerative lime kiln having two shafts, the process comprising:
    cyclically operating the two shafts alternately as a burning shaft and as a regenerative shaft;
    introducing the carbonate rock in an upper region of each of the two shafts of the cocurrent regenerative lime kiln, wherein each upper region is configured as a preheating and burning zone;
    preheating and calcining the carbonate rock in the upper region of each of the two shafts;
    cooling the carbonate rock in a lower region of each of the two shafts, wherein each lower region is configured as a cooling zone and has a central displacement body; and
    discharging the carbonate rock via a discharge device in each of the two shafts;
    wherein the cooling of the carbonate rock comprises introducing cooling air into the cooling zone of each of the two shafts to cool the carbonate rock, wherein 90-100% of the cooling air introduced into the shaft operating as the burning shaft is introduced via the central displacement body and 10% or less of the cooling air introduced into the shaft operating as the burning shaft is introduced in a region of the discharge device, wherein 90-100% of the cooling air introduced into the shaft operating as the regenerative shaft is introduced in a region of the discharge device and 10% or less of the cooling air introduced into the shaft operating as the regenerative shaft is introduced via the central displacement body.

2. The process of claim 1 further comprising:
    feeding 20-50% of an amount of cooling air that is fed into the two shafts into the shaft operating as the burning shaft; and
    feeding a remainder of the amount of cooling air that is fed into the two shafts into the shaft operating as the regenerative shaft.

3. The process of claim 2 comprising feeding 30%±10% of the amount of cooling air that is fed into the two shafts into the shaft operating as the burning shaft.

4. The process of claim 1 further comprising feeding cooling air into the region of the discharge device in each of the two shafts through dams of material formed by calcined and cooled carbonate rock.

5. The process of claim 1 wherein the cooling air fed into the region of the discharge device of each of the two shafts flows upward and to a middle of each of the two shafts.

6. The process of claim 1 wherein the cooling air fed in via the central displacement body of each of the two shafts flows upward and to an outer boundary of each of the two shafts.

7. The process of claim 1 wherein discharging of the carbonate rock via the discharge device in each of the two shafts comprises discharging 60-80% of the carbonate rock radially outward and discharging a remainder of the carbonate rock radially inward.

8. The process of claim 1 wherein if the carbonate rock has a $CaCO_3$ content of more than 97%, the process comprises feeding cooling air into each of the two shafts in a total amount of less than 0.70 standard $m^3$/kg of calcined carbonate rock.

* * * * *